Aug. 9, 1938.     F. J. RAMSEY     2,126,662
HYDRAULIC TRANSMISSION
Filed Oct. 14, 1936     7 Sheets-Sheet 4

Aug. 9, 1938.   F. J. RAMSEY   2,126,662
HYDRAULIC TRANSMISSION
Filed Oct. 14, 1936   7 Sheets-Sheet 5

Inventor:
Fred J. Ramsey
by his Attorneys
Lawson & Lawson

Patented Aug. 9, 1938

2,126,662

UNITED STATES PATENT OFFICE 2,126,662

HYDRAULIC TRANSMISSION

Fred J. Ramsey, Harrisburg, Pa.

Application October 14, 1936, Serial No. 105,579

13 Claims. (Cl. 74—293)

This invention relates to hydraulic transmissions, and has for an important object thereof the provision, in a structure of this character, of a variable transmission mechanism eliminating the slippage ordinarily occurring in overcoming starting torque.

A further object of the invention is the provision in apparatus of this character of the equivalent of a low gear ratio such as is ordinarily employed in the usual mechanical transmission, the effectiveness of both the low and high speeds of the transmission being variably controllable so that an extremely smooth and positive action can be obtained.

A further object of the invention is to incorporate in a mechanism of this character and in the hydraulic transmission mechanism proper an overrunning clutch mechanism which is effective during speed changes of the transmission, but becomes inoperative at high speeds.

Further objects of the invention are, the provision of an apparatus of this character in which the controlling valves are freely movable under pressure; in which all gears are in constant mesh; in which a short stroke pedal suffices to control the entire operation; in which there is no pumping action when the pedal is not being used; and in which the arrangement is such that all gears in the transmission proper may be mounted directly upon anti-friction bearings.

These and other objects I attain by the construction shown in the accompanying drawings wherein, for the purpose of illustration, I have shown a preferred embodiment of my invention and wherein:

Figure 16:
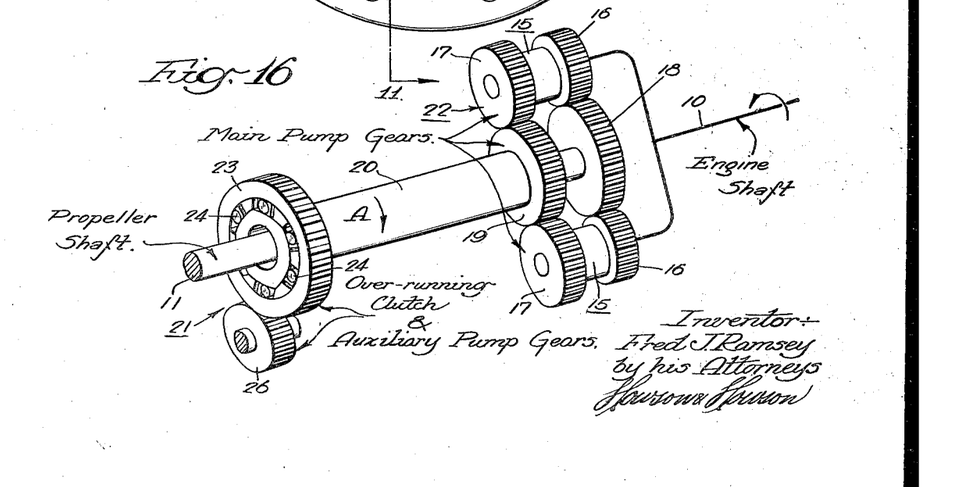
Fig. 16 is a diagrammatic perspective illustrating the operation of the transmission.

Referring now more particularly to the drawings, the numeral 10 designates the input shaft of the transmission at present illustrated as comprising the crank shaft of an internal combustion engine, and 11 an output shaft at present illustrated as connected with the torque shaft 12 through a transmission mechanism generally designated at 13. The input shaft 10 drives directly a casing 14 rotatably supporting a plurality of planetary units 15. These planetary units 15 each embody a small pinion 16 and a larger pinion 17 engaging respectively a gear 18 on the output shaft 11 and a gear 19 upon a sleeve 20 rotatably surrounding the shaft 11. It will be immediately recognized (see Figure 16) that the gearing 16 to 19 taken in conjunction with the driving casing 14 comprises a planetary transmission. With the gear 18 at rest, as it would be if it were secured to the torque shaft of an automobile of which the shaft 10 comprised the shaft of the motor, and the motor were in operation, the units 15 bodily rotating about gear 18 would transmit their rotation through pinion 17 and gear 19 to the sleeve 20, and, since pinion 16 is of smaller diameter than pinion 17 and gear 18 of larger diameter than the gear 19, the sleeve 20 would rotate in the direction of the arrow A.

Quite as obviously, if the sleeve 20 be braked against rotation under these conditions, a tendency is set up through units 15 to rotate the gear 18, and as soon as the torque generated is sufficient to overcome the load imposed upon shaft 11, gear 18 and shaft 11 will begin to rotate at a speed much reduced from that of the drive shaft. Likewise, if the gears 19 and 17 are held against relative rotation, or if a braking effect is exercised upon the units 15 to prevent their rotation about their axes, the speed of rotation of the gear 18 will be increased proportionately to the braking action until finally when rotation of the units 15 is completely checked the gears 16 to 19, shaft 10, sleeve 20, and shaft 11 will rotate as a unit.

In order that the braking effects may be obtained smoothly and the transmitted forces may be gradually applied to the shaft 11, I provide gear pumps 21 and 22, and means to control the output of these pumps, and thereby the braking effects upon the sleeve 20 and the units 15. The pump 21 comprises a main gear element 23 connected with the sleeve 20 through an overrunning clutch mechanism at present disclosed as comprising spring-pressed rollers 24 operating in tapered slots 25 provided between the gear element proper and sleeve 20, this clutch functioning to connect gear 23 and sleeve 20 when the direction of rotation of the sleeve 20 is that of the arrow A of Fig. 16, and to release the gear element 23 when the direction of rotation of sleeve 20 is reversed.

Figure 7:
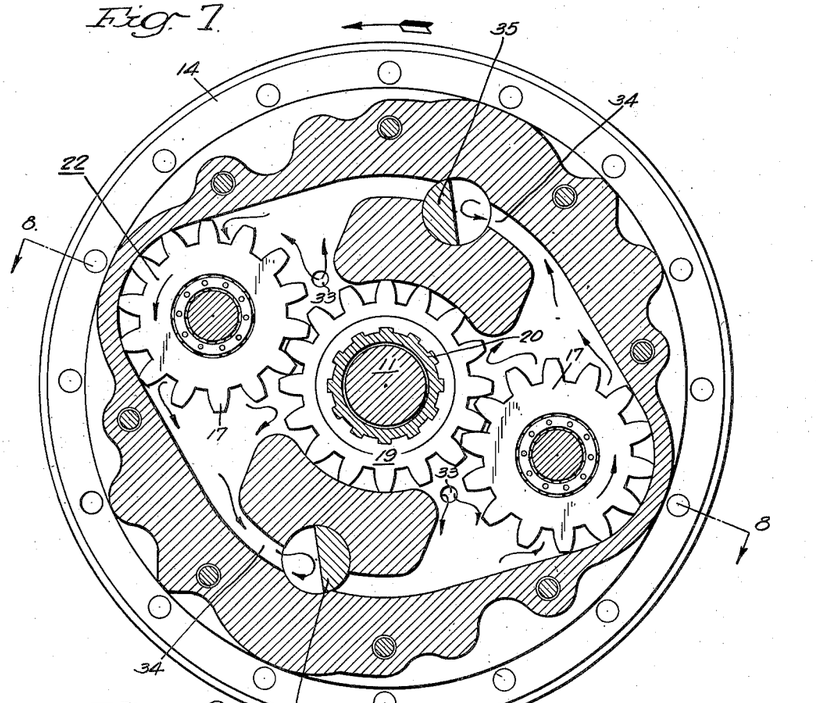
Fig. 7 is a section on line 7—7 of Fig. 3.
Figure 8:
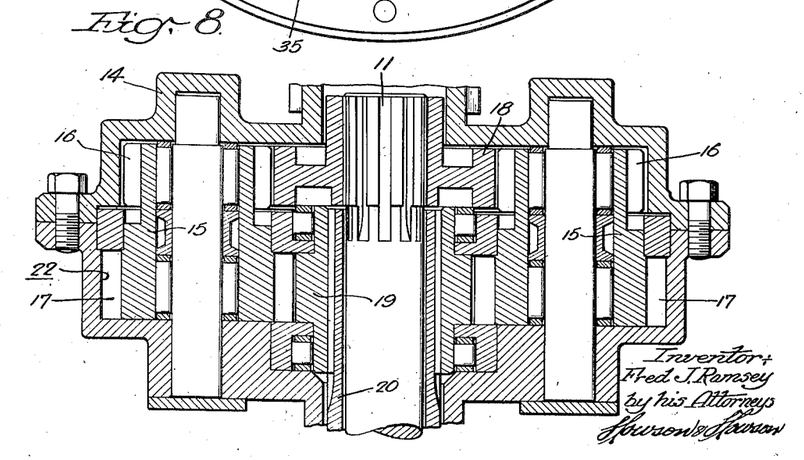
Fig. 8 is a section on line 8—8 of Fig. 7.

This pump further comprises a secondary or idler gear 26, and a casing 27 within which the idler gear and the co-acting portion of the gear 23 operate. This casing has a small inlet 28 and a relatively large outlet 29 these proportions being preferred to insure against unwanted back pressure at the outlet. Outlet 29 is controlled by a valve 30, in turn controlled through a link and lever system 31 by a clutch pedal 32. Pump 22 comprises the gear 19 of sleeve 20 and the pinions 17 of the elements 15, as more clearly shown in Fig. 7. There are, of course, pumping units 22 corresponding in number to units 15, each pumping unit having a restricted inlet 33 and an enlarged outlet 34 controlled by a valve 35. The casing of pumps 22 comprises one end of casing 14 and a partition plate arranged therein.

It will be obvious that with the valves 30 and 35 open the conditions will be exactly the same as if the transmission mechanism were free from the action of the pumps 21 and 22. If valve 30 of pump 21 is now gradually closed, the resistance to rotation of the pump gears 23, 26, and, accordingly to rotation of sleeve 20 and gear 19 in the direction of arrow A, is gradually increased until with complete closure of valve 30 the sleeve is locked against rotation. When the resistance to rotation of sleeve 20 has set up the proper forces, gear 18 will begin to turn and its speed will increase to the point where sleeve 20 has completely ceased rotation, but due to the planetary action will remain considerably below the speed of input shaft 10. By gradually closing valves 35, the resistance to rotation of the units 15 is gradually increased until finally, as these valves are completely closed, the units 15 are locked against rotation and the entire assemblage rotates as a unit. At this time the direction of rotation of sleeve 20 will be the reverse of that indicated by the arrow A in Fig. 16. The clutch elements 24 will be disposed at the larger ends of their slots so that pump 21 is freed from operation. Any attempt of shaft 11 to overrun the input shaft 10 will merely result in an attempted rotation of sleeve 20 in the direction of the arrow A. It will thus be obvious that when the vehicle is operating at high speeds and the engine speed is decreased, the braking effect of the engine is available. It will thus be obvious that free-wheeling is only attained at those times when the operation is actively employing the pedal 32 and, accordingly, has the vehicle under control.

Figures 9, 10:
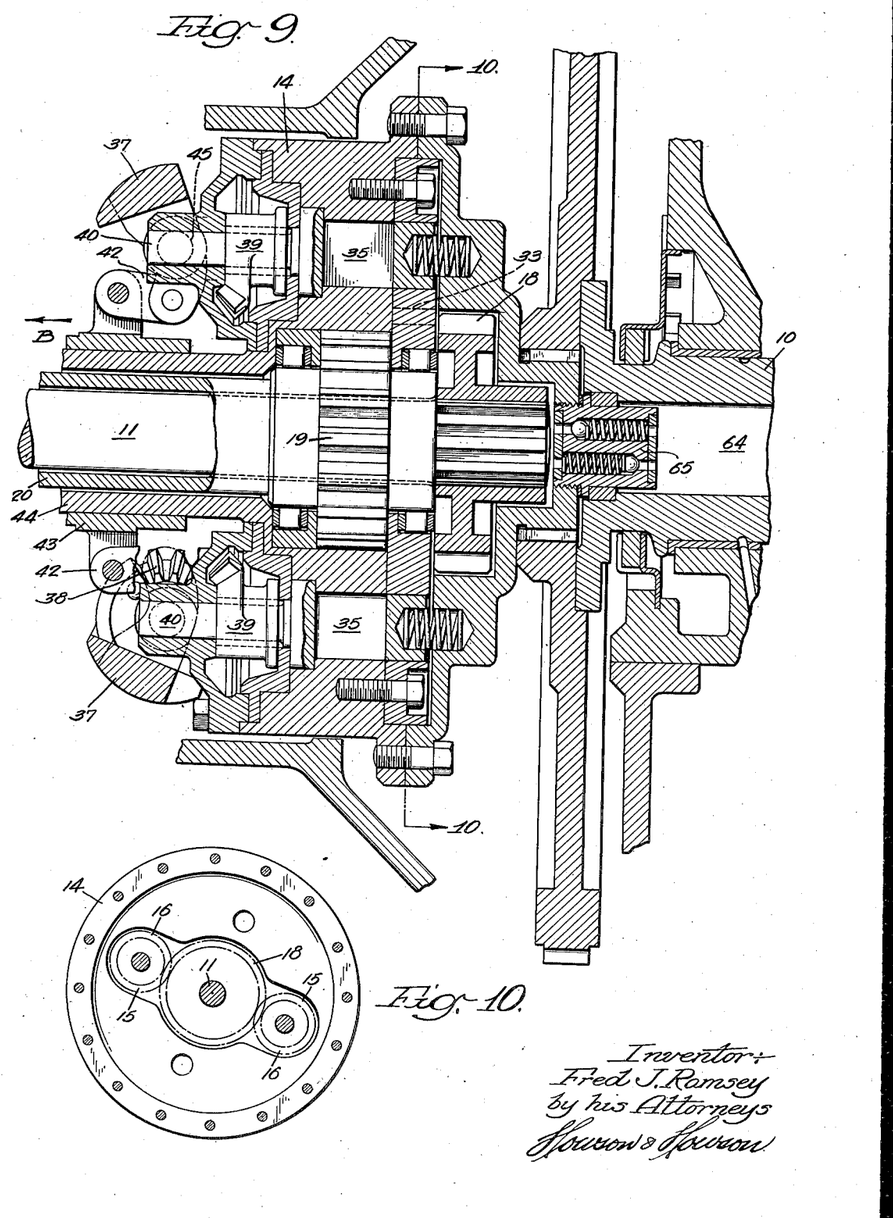
Fig. 9 is a section on line 9—9 of Fig. 6.
Fig. 10 is a section on line 10—10 of Fig. 9.
Figures 11, 12, 13:
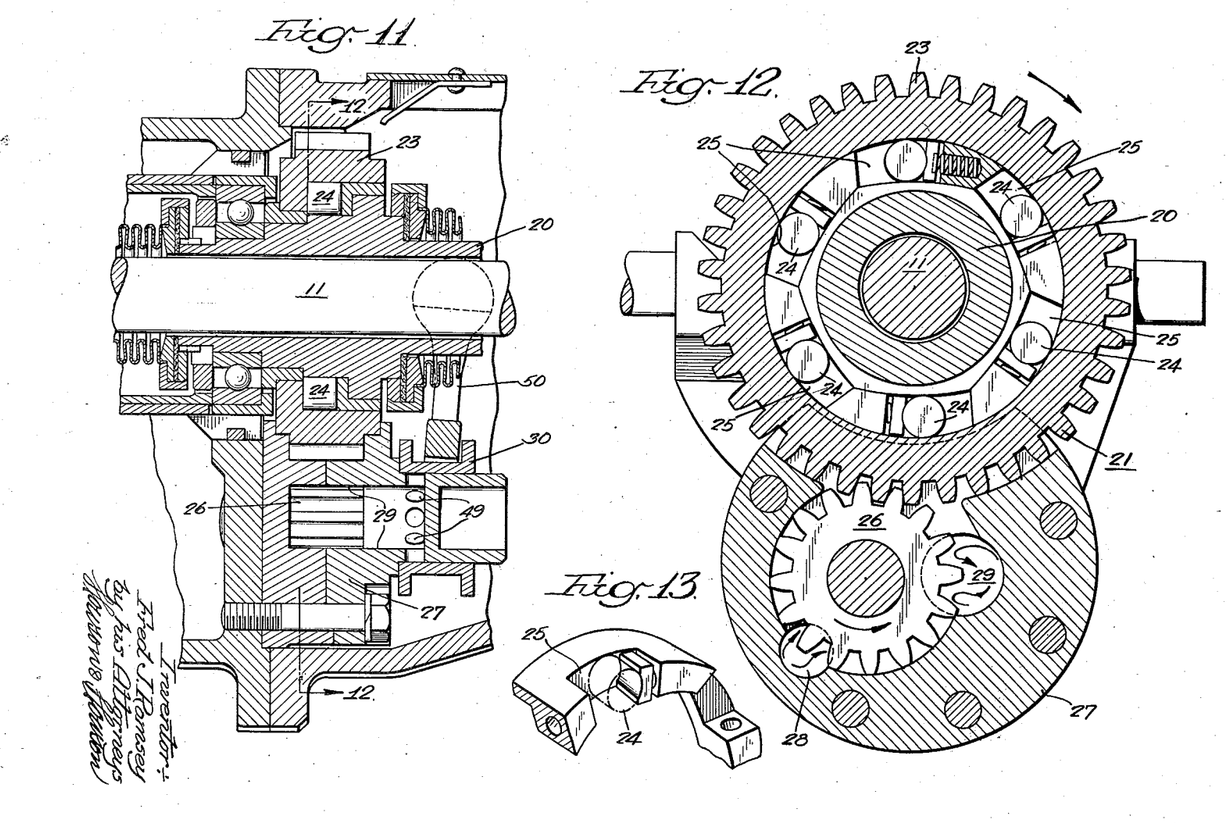
Fig. 11 is a section on line 11—11 of Fig. 5.
Fig. 12 is a section on line 12—12 of Fig. 11.
Fig. 13 is a fragmentary perspective view of a portion of the overrunning clutch mechanism.
Figures 14, 15:
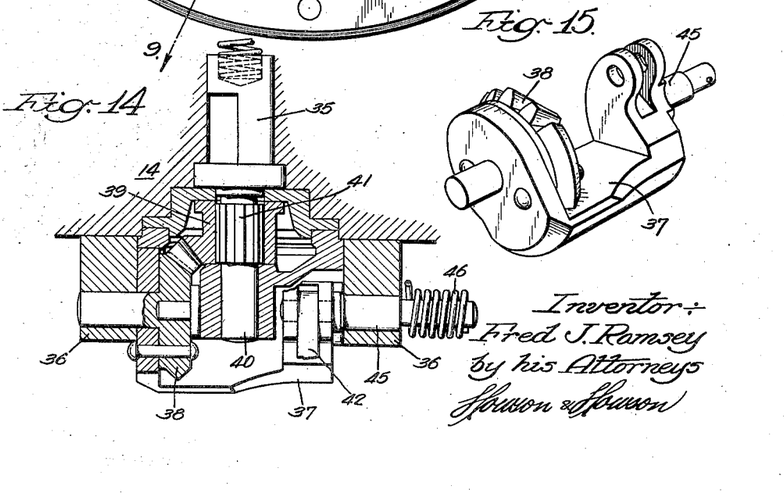
Fig. 14 is a detail sectional view on line 14—14 of Fig. 6.
Fig. 15 is a perspective of one of the valve control mechanisms for the main pump.

While, obviously, many arrangements can be employed in control of the sequential operation of the valves of pumps 21 and 22, the construction illustrated is preferred for this purpose. As hereinbefore stated, valves 35 controlling pumps 22 are rotary valves and upon the outer surface of the pump casing formed by the housing 14 I mount bearings 36 in which an oscillatable yoke 37 is, in turn, mounted. The yoke 37 incorporates a segment gear 38 which is fixed to the yoke to oscillate therewith and co-acts with a segment gear 39 splined upon the stem 40 of the valve as at 41. The yokes 37 are linked at 42 to ears formed on a sleeve 43 slidable upon sleeve 44 surrounding the sleeve 20 of the planetary mechanism. One stub shaft 45 of each yoke is extended beyond its bearing and is provided with a torsion spring 46 which constantly urges rotation of the yoke in a direction tending to close the valve and, accordingly, tends to shift the sleeve 43 in the direction of the arrow B of Figure 9 and maintain it in proper engagement with a shifting fork 47 mounted upon a rock shaft 48. The body of the yoke is of sufficient weight and is so disposed that during rotation of the casing 14 the yokes act as centrifugal control elements constantly tending to urge the movement of sleeve 43 in the same direction.

Valve 30 of the pump 21 is merely a tubular slide valve controlling a series of ports 49 in a tubular extension of the discharge port 29 and this valve is shifted through a fork 50 mounted upon stub rock shafts 51, one of which is extended to the exterior of the casing. The control for these rock shafts comprises the pedal 32 and the link and lever connections 31 hereinbefore referred to.

Figures 1, 2:
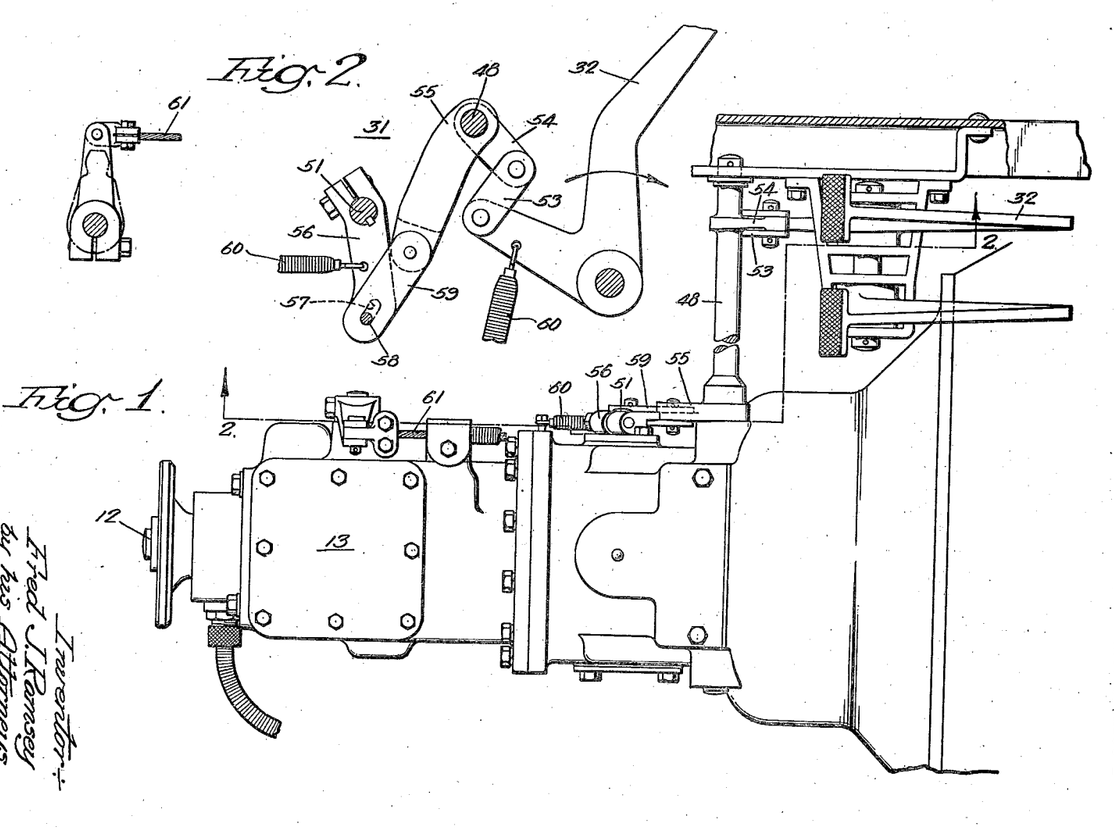
Fig. 1 is a plan view of a transmission constructed in accordance with my invention.
Fig. 2 is a section on line 2—2 of Fig. 1.
Figures 3, 4:
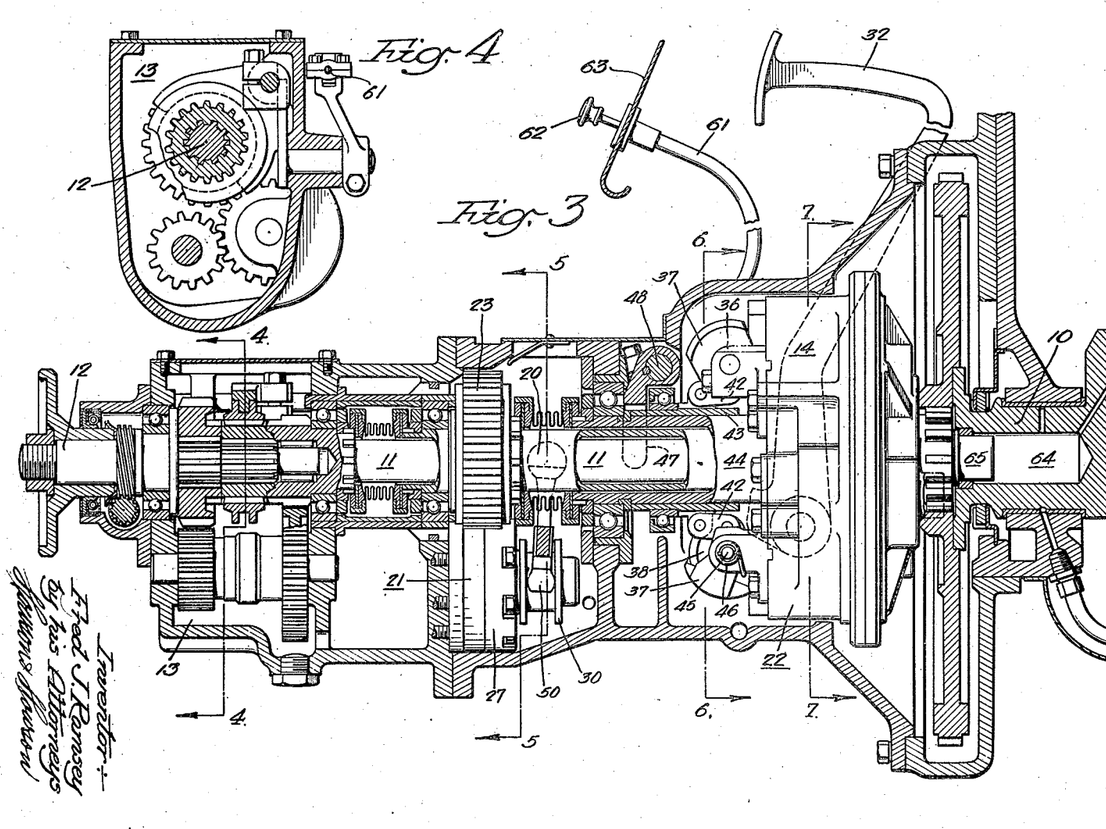
Fig. 3 is a longitudinal view, partially in section and partially in elevation, of the transmission mechanism.
Fig. 4 is a section on line 4—4 of Fig. 3.
Figure 5:
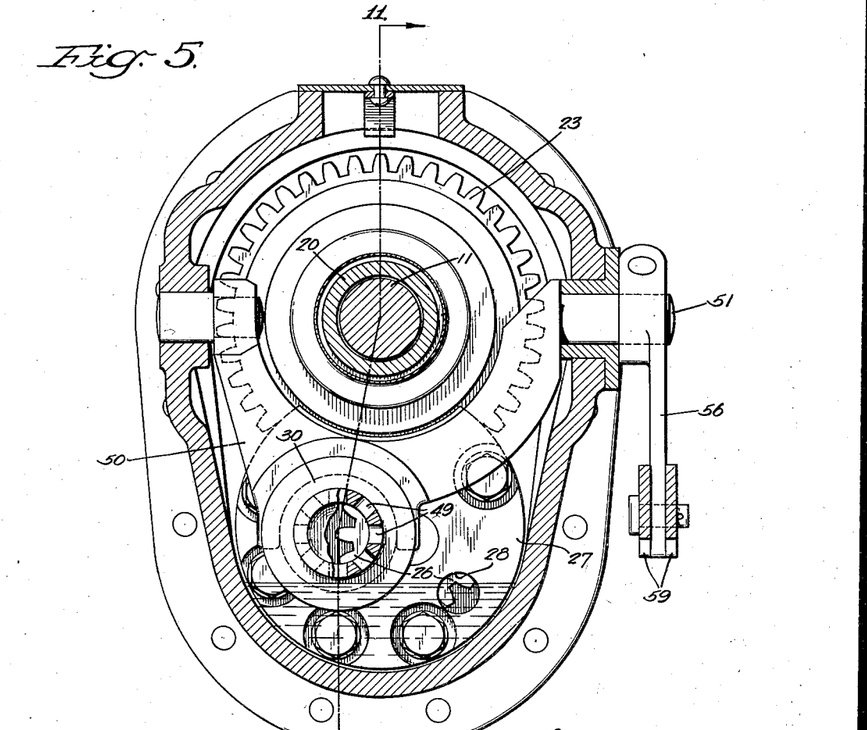
Fig. 5 is a section on line 5—5 of Fig. 3.
Figure 6:
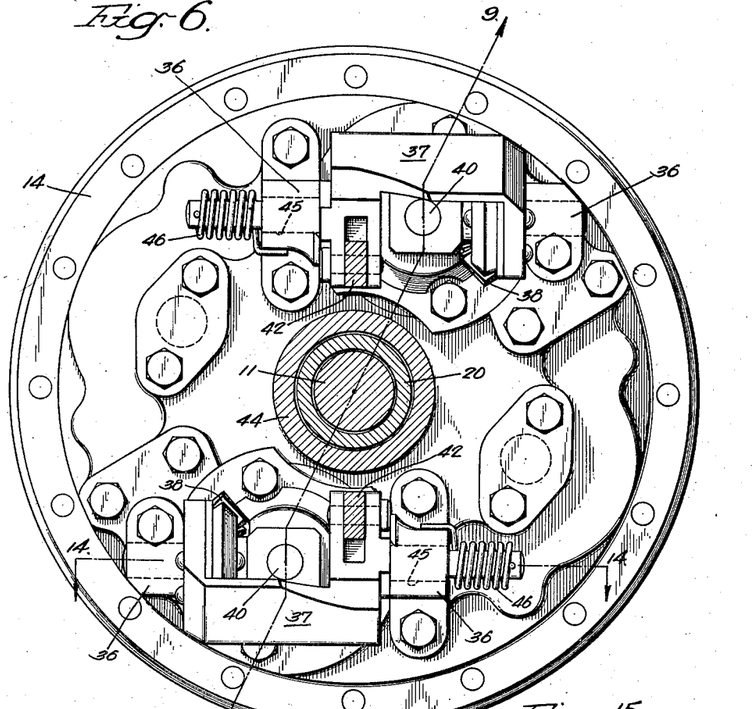
Fig. 6 is a section on line 6—6 of Fig. 3.

The clutch pedal is in the form of a bell crank lever the long arm of which has the usual foot pad and the shorter arm 52 of which is linked at 53 to the shorter arm 54 of a bell crank lever 55 secured to shaft 48. Secured to the extended shaft 51 is an arm 56 which has a sleeve 57 at its free end receiving a pin 58 carried by the lower end of a link 59 connected to the long arm of bell crank lever 55. Springs 60 tend to maintain the arm 56 and pedal 32 in the positions in which they are illustrated in Fig. 2 and in which positions the associated valves controlled by the rock shafts 48 and 51 are closed. The relative centers of the bell crank 55 and the link connection 59 and arm 56 are such that primary movement of the pedal 32 in the direction of the arrow of Fig. 2 merely causes pin 58 to slide in slot 57 without causing any movement of arm 56 or fork 50, so that the valve 30 remains closed. In the meantime, however, shaft 48 has oscillated and through fork 47 has substantially fully opened the valves 35. Continued movement of the pedal in the direction of the arrow completes the opening of valves 35 and finally opens the valve 30. This complete movement results in a slight over-opening of valves 35.

In the reverse movement of the pedal, these operations are reversed. The primary movement of the pedal, while effecting a slight rotation of shaft 48 does not close the valves 35 to a sufficient extent to offer any obstruction to the flow of fluid from the pumps 22, but this primary movement shifts link 59 to such a point that the arm 56 and, accordingly, valve 30 may return to their illustrated positions, thus fully closing valve 30 and checking rotation of sleeve 20. A continued reverse movement of the pedal under the influence of its spring and control of the foot of the operator closes valves 35 to check rotation of the planetary units 15.

The construction hereinbefore described constitutes, obviously, merely a control of the speed of rotation in one direction of shaft 11 and in order to provide the neutral, reverse and forward controls essential in a motor vehicle, the transmission 13 is employed. This transmission is of any usual type providing these three positions and, since a gear shift in its normal sense is not essential in the transmission, control of the operation of the master clutch of this transmission is preferably effected through a flexible shaft 61 and a control knob 62 mounted on the dash 63 of the vehicle.

Replenishment of the supply of fluid to pumps 21 and 22 is preferably effected by utilizing a connection with the lubricating system 64 of the associated engine through a control mechanism 65 such as fully described in my co-pending application Serial No. 706,566 for Hydraulic transmission, filed January 13, 1934, although, of course, any suitable means to this end may be employed.

Since the construction illustrated is obviously capable of considerable modification without departing from the spirit of my invention, I do not wish to be understood as limiting myself thereto except as hereinafter claimed.

I claim:

1. In a transmission, a planetary train comprising a driven orbit element, two gears, a rotatable rigid planet unit rotating with said orbit element and including a pinion for and engaging each of said gears, a circulating system including a pump driven by one of said gears, means to interrupt said system thereby braking said gear, means to brake rotation of said planet unit comprising a gear pump including one of said gears and the co-acting pinion of said planet unit, the relative sizes of said gears and pinions being such that the gear driving the first mentioned pump tends to rotate in one direction when the planet unit is free, and in the opposite direction when the unit is braked, and means to disconnect the pump and said gear when the gear rotates in the last-named direction.

2. In a transmission, a planetary train comprising a driven orbit element, two gears, a rotatable rigid planet unit rotating with said orbit element and including a pinion for and engaging each of said gears, a circulating system including a pump driven by one of said gears, means to interrupt said system thereby braking said gear, and means to brake rotation of said planet unit comprising a gear pump including one of said gears and the co-acting pinion of said planet unit.

3. In a transmission, a driven orbit element, two gears, a rotatable planet unit rotating with said orbit element and including a pinion for and engaging each of said gears, a circulating system including a pump driven by one of said gears, means to interrupt said system thereby braking said gear, means to brake rotation of said planet unit comprising a gear pump including one of said gears and the co-acting pinion of said planet unit, and a valve to control the discharge of said pump, centrifugally controlled means tending to close said valve and means to positively control said valve.

4. In a transmission, a driven orbit element, two gears, a rotatable planet unit rotating with said orbit element and including a pinion for and engaging each of said gears, means to brake rotation of one of said gears and means to brake rotation of said planet unit comprising a liquid circulating system operated at least in part by said planet unit, a valve to interrupt flow in said system, centrifugally-operated means tending to close said valve, and means to positively operate said valve.

5. In a transmission, a planetary train comprising a driven orbit element, two gears, a rotatable rigid planet unit rotating with said orbit element and including a pinion for and engaging each of said gears, a gear pump, a driving connection between the gear pump and one of said gears, means to interrupt discharge from the gear pump, and means to brake rotation of said planet unit, the driving connection between said pump and gear including an overrunning clutch.

6. In a transmission, a driven orbit element, two gears, a rotatable planet unit rotating with said orbit element and including a pinion for and engaging each of said gears, a gear pump, a driving connection between the gear pump and one of said gears, a valve to interrupt discharge from the gear pump, means to brake rotation of said planet unit comprising a gear pump including one of said gears and the coacting pinion of said planet unit, and a valve controlling the discharge of said pump, manually controlled means to operate said valves and centrifugally operated means tending to close the valve of the last-named gear pump.

7. In a transmission, a planetary train comprising a positively driven orbit element, two gears, a rotatable rigid planet unit rotating with said orbit element and including a pinion for and engaging each of said gears, the ratios of said gears to their respective pinions differing from one another, means to brake rotation of one of said gears thereby causing the other of the gears to be driven through said pinions by rotation of the orbit element, and means to brake rotation of said planet unit, comprising a gear pump including one of said gears and the coacting pinion of said planet unit.

8. In a transmission, a planetary train comprising a positively driven orbit element, two gears, a rotatable rigid planet unit rotating with said orbit element and including a pinion for and engaging each of said gears, the ratios of said gears to their respective pinions differing from one another, means to brake rotation of one of said gears thereby causing the other of the gears to be driven through said pinions by rotation of the orbit element, means to brake rotation of said planet unit, comprising a gear pump including one of said gears and the coacting pinion of said planet unit, a control member movable in opposite directions, and operative connections between said braking means and control member constructed and arranged to sequentially apply said means during movement of the control member in one direction and reversely sequentially release said means during its movement in the opposite direction.

9. In a transmission, a planetary train comprising a positively driven orbit element, two gears, a rotatable rigid planet unit rotating with said orbit element and including a pinion for and engaging each of said gears, the ratios of said gears to their respective pinions differing from one another, means to brake rotation of one of said gears thereby causing the other of the gears to be driven through said pinions by rotation of the orbit element, means to brake rotation of said planet unit, comprising a gear pump including one of said gears and the coacting pinion of said planet unit, a valve controlling the discharge of said pump, centrifugally controlled means tending to close said valve, and means to positively close said valve.

10. A device as set forth in claim 7 wherein the means to brake rotation of one of said gears comprises a gear pump driven thereby, and means to interrupt the discharge of said gear pump.

11. A device in accordance with claim 7 wherein the means to brake rotation of one of said gears comprises a gear pump, valves to control both said gear pumps and means to control said valves.

12. A device in accordance with claim 7 wherein the means to brake rotation of one of said gears comprises a gear pump having driving connection with said gear, said driving connection including an overrunning clutch.

13. A device in accordance with claim 7 wherein the means to brake rotation of one of said gears comprises a gear pump, valves controlling the discharge of said pumps, manually controlled means to operate said valves and centrifugally-operated means tending to close the valve of the gear pump braking the planet unit.

FRED J. RAMSEY.